(12) United States Patent
Koster et al.

(10) Patent No.: US 8,375,277 B2
(45) Date of Patent: Feb. 12, 2013

(54) MULTICAST WITH UDP USING PACKET IDENTIFIER IN MPEG PAYLOAD

(75) Inventors: Arian Koster, Mijdrecht (NL); Alejandro Vicente Casal Gomez, The Hague (NL); Jeroen Veen, Utrecht (NL)

(73) Assignee: Koninklijke KPN N.V., The Hague (NL)

( * ) Notice: Subject to any disclaimer, the term of this patent is extended or adjusted under 35 U.S.C. 154(b) by 427 days.

(21) Appl. No.: 12/635,386

(22) Filed: Dec. 10, 2009

(65) Prior Publication Data

US 2010/0153827 A1 Jun. 17, 2010

(30) Foreign Application Priority Data

Dec. 15, 2008 (EP) .................................... 08021780

(51) Int. Cl.
*H03M 13/00* (2006.01)
(52) U.S. Cl. .................. 714/776; 714/748; 370/390
(58) Field of Classification Search .................. 714/776, 714/748; 370/390
See application file for complete search history.

(56) References Cited

U.S. PATENT DOCUMENTS

| | | | | |
|---|---|---|---|---|
| 6,014,706 | A | * | 1/2000 | Cannon et al. ................ 709/231 |
| 6,031,818 | A | * | 2/2000 | Lo et al. ........................ 370/216 |
| 2003/0206549 | A1 | * | 11/2003 | Mody et al. ................... 370/390 |
| 2006/0225118 | A1 | | 10/2006 | Rolls et al. |
| 2007/0064718 | A1 | * | 3/2007 | Ekl et al. ....................... 370/432 |
| 2007/0153806 | A1 | * | 7/2007 | Celinski et al. ........... 370/395.52 |
| 2008/0060030 | A1 | | 3/2008 | Chang et al. |

FOREIGN PATENT DOCUMENTS

| | | |
|---|---|---|
| EP | 1868342 | 12/2007 |
| WO | WO 98/51052 | 11/1998 |

OTHER PUBLICATIONS

European Search Report, European Patent Applicatino 08021780.5 dated May 20, 2009.

* cited by examiner

*Primary Examiner* — Philip Guyton
(74) *Attorney, Agent, or Firm* — McDonnell Boehnen Hulbert Berghoff LLP

(57) ABSTRACT

Content information is multicast via a data network to a plurality of receivers, using data packets in a transport stream. The content information is encapsulated according to a container format standard that allows an optional field in a packet header. Each data packet forms a payload of a datagram in a connectionless communication protocol. The optional field in each data packet is used to carry an identifier for identifying the data packet in a pre-determined sequence of the data packets. The use of the optional field enables packet loss detection at the receiver.

12 Claims, 3 Drawing Sheets

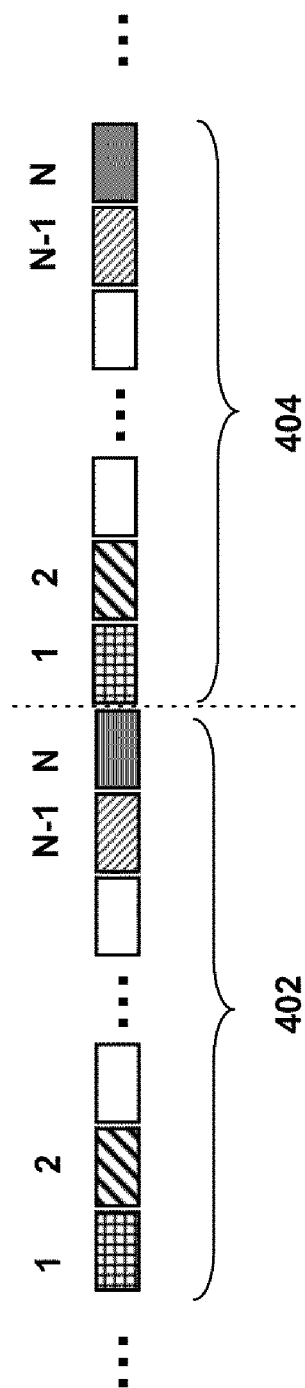

MULTICAST WITH UDP USING PACKET IDENTIFIER IN MPEG PAYLOAD

CROSS REFERENCE TO RELATED APPLICATIONS

The present application claims priority to European Patent Application EP 08021780.5, filed in the European Patent Office on Dec. 15, 2008, the entire contents of which are incorporated herein by reference.

FIELD OF THE INVENTION

The invention relates to a method of multicasting content information via a data network to a plurality of receivers using data packets of a transport stream. The invention further relates to data processing equipment comprising an interface to a data network and configured for processing content information received via the data network, and to control software for use on such equipment.

BACKGROUND

Internet Protocol TV (IPTV) is a system that delivers content information (e.g., video and/or audio) via a data network, such as the Internet, to a network-enabled data processing device, e.g., a set-top box (STB) or a personal computer (PC). IPTV typically uses a multicast technology if the content information is a live broadcast, and a unicast technology for, e.g., a video-on-demand or for implementing a pause functionality in a live broadcast. Multicast is an addressing method for the simultaneous transmission of data to multiple destinations. Multicast is an efficient approach in that the data is delivered over each link of the network only once and in that copies of the data are created only where links to destinations split. Unicast, on the other hand is the addressing method for delivery of data from a single source to a single destination. Using unicast per individual one of a group of receivers typically requires more bandwidth than multicast to the same group.

The content information is typically transported via a data network using the MPEG-2 Transport Stream format, (MPEG-data), although other container formats are feasible, e.g., Advanced Systems Format (ASF), Audio Video Interleave (AVI), etc. As is known, the expression "container format" refers to a multiplexing format that can contain various types of data, compressed by means of audio/video codecs. Currently, there are two main approaches being used to transport MPEG-2 data using the Internet Protocol (IP).

In a first approach, the MPEG-data form the payload of UDP datagrams. The acronym "UDP" stands for User Datagram Protocol (or: Universal Datagram Protocol). UDP is not a reliable protocol in the sense that datagrams may be received out of order, may be duplicated, or may have disappeared without notice. On the other hand, UDP avoids the overhead of checking whether every datagram has actually arrived, thus making it a fast and efficient protocol for applications that do not need guaranteed delivery. Time-sensitive applications often use UDP because dropped packets are preferred to delayed packets.

In a second approach, the MPEG-data are encapsulated in UDP datagrams that themselves form the payload of Real-time Transport Protocol (RTP) packets. RTP defines a standardized packet format for delivery of real-time data, such as audio and/or video, over the Internet using the IP. RTP provides suitable functionality for carrying real-time information content, e.g., a timestamp and control mechanisms for synchronizing different streams with timing properties. An RTP packet has a header comprised of a plurality of fields, among which is the field "sequence number." This field carries a numerical value that increments by one for each next RTP data packet transmitted. This field may be used by the receiver to detect packet loss and to restore packet sequence. Accordingly, RTP requires more overhead than UDP alone.

Now consider the scenario of a network operator multicasting content information such as a TV program from a source, e.g., a server, to a group of receivers, typically STBs or PCs, via a data network. If RTP is being used, packet loss can be easily detected at the receiver and the missing packets can be easily identified, based on the packet sequence numbers. The network operator may have reserved a buffer server that buffers at least part of the content information. When a receiver detects packet loss and identifies the missing packet, the receiver can contact the buffer server with a request to send the missing packets. The buffer server then responds by sending the missing packets to the requesting receiver. If the operations of detecting packet loss, identifying the missing packets, sending the request to the buffer server and receiving the missing packets, can be carried out in a small enough time window, the receiver can restore the integrity of the content information in time for rendering without user-perceptible artifacts.

SUMMARY

The above scenario is readily implemented if the multicasting is implemented using RTP. If, however, the multicasting is implemented using less reliable transmission protocols, such as UDP without RTP, packet loss detection may not be possible, and it may be impossible to identify which packets or datagrams may have gone missing.

The inventors now propose an elegant manner to use the less reliable transmission, thereby saving overhead and bandwidth, and nevertheless able to detect packet loss and identify lost packets at the receiver. As a consequence, the receiver can request and receive the lost packets from the buffer server in a timely manner in order to restore content information integrity.

More specifically, the inventors propose a method of multicasting content information to a plurality of receivers, via a data network, using data packets in a transport stream. The content information is encapsulated according to a container format standard that allows an optional field in a packet header. Each respective one of the data packets forms a payload of a respective datagram in a connectionless communication protocol. The method comprises using the optional field in each respective one of the data packets to carry a respective one of multiple identifiers for identifying the respective data packet in a pre-determined sequence of data packets.

In the invention, the packet header may carry the information which enables the receiver to determine whether packet loss has occurred and, if so, which packet is missing. The packet loss is tackled at a higher layer in the OSI stack than the transport layer. An advantage of the invention over the above scenario using RTP is that less overhead is required in the communication between the source of the content information and the receivers.

Connectionless telecommunication protocols are protocols used to communicate from a transmitter via a network to a receiver without prior knowledge at the transmitter that the receiver is indeed available and/or ready for receiving. The transmitter just sends the data packet to the address of the receiver. In contrast, connection-oriented protocols allow establishing a network connection between transmitter and receiver before the actual sending of the data. Connectionless protocols are therefore more susceptible to transmission problems, which often require that a message be sent several times. Connectionless protocols are also referred to as "stateless protocols" as the communicating nodes on the network are not keeping track of the communication while it is going on. Connection-oriented protocols are referred to as "stateful" protocols because they do keep track of the ongoing communication. Examples of connectionless protocols are the Internet Protocol (IP), the User Datagram Protocol (UDP), and the Transparent Inter-process Communication (TIPC). An example of a connection-oriented protocol is the Transmission Control Protocol used over IP (TCP/IP).

In one embodiment of the invention, at least part of the content information is buffered during the multicasting. Upon receipt of a specific one of the identifiers from a particular one of the receivers, a specific one of the data packets associated with the specific identifier, is sent via a unicast to the particular receiver. Preferably, a history per particular receiver is maintained of the specific data packets sent to the particular receiver via previous unicasts. Based on the history, it is then determined to send in the current unicast one or more further data packets having further ones of the identifiers belonging to a particular range of the identifiers. As data packets typically go missing in a specific temporal pattern, e.g., in bursts, this pattern can be used to forecast the number of data packets to be sent upon receipt from a specific receiver of an identifier of a next missing data packet. For example, consider a history log of a particular receiver that is submitting individual requests for individual packets. Analysis of the history log may show that the requested packets typically turn out to be clustered in batches of three packets with numerically successive identifiers. It may then be determined at the buffer that, upon receipt of the next request from this particular receiver for a specific packet, the two succeeding packets are sent together with the one just requested. In turn, the receiver may be configured to halt sending requests for succeeding packets once it receives multiple packets per unicast event. That is, a single request from a receiver for a specific packet eventually results in receiving the specific packet as well as its successors at the receiver. Thus, the network traffic generated by the requesting receivers and by the unicasts of missing packets may be optimized.

Above embodiments relate to a method and are commercially relevant to, e.g., network operators and service providers.

The invention can also be embodied by data processing equipment, e.g., a set-top box, a personal computer, a smart phone, etc. Such embodiment is relevant to the commercial exploitation of the invention by, e.g., hardware manufacturers, set makers, distributors, etc. The equipment comprises an interface to a data network configured for processing content information received via the data network as data packets in a transport stream. The content information is encapsulated according to a container format standard that allows an optional field in a packet header. Each respective one of the data packets forms a respective payload of a respective datagram in a connectionless communication protocol. The optional field in each respective one of the data packets carries a respective identifier for identifying the respective data packet in a pre-determined sequence of the data packets. The equipment is configured for determining loss of a specific one or more of the data packets on the basis of the identifiers in the data packets received and for requesting via the data network the specific one or more of the data packets.

The invention can also be embodied by control software, e.g., provided on a computer-readable medium or via a download from a server on the Internet, for control of data processing equipment, the data processing equipment comprising an interface to a data network and being configured for processing content information received as data packets in a transport stream via the interface.

It should be understood that any of the methods described herein could be implemented within hardware, software, or any combination thereof. For example, when a method is implemented in software, it should be noted that the method can be stored on any computer-readable medium for use by, or in connection with, any computer-related system or method. In the context of this document, a computer-readable medium is an electronic, magnetic, optical, or other physical device or means that can contain or store a computer program for use by, or in connection with, a computer related system or method. The methods can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Any process descriptions or steps described herein should be understood as potentially representing modules, segments, or portions of code which include one or more executable instructions for implementing specific logical functions or steps in the process, and alternate implementations are included within the scope of the preferred embodiments of the methods in which functions may be executed out of order from that shown or discussed, including substantially concurrently or in reverse order, depending on the functionality involved, as would be understood by those reasonably skilled in the art. Furthermore, steps may be omitted altogether or combined with steps from other processes.

The content information is encapsulated according to a container format standard that allows an optional field in a packet header. Each respective one of the data packets forms a respective payload of a respective datagram in a connectionless communication protocol. The optional field in each respective one of the data packets carries a respective identifier for identifying the respective data packet in a pre-determined sequence of data packets. The control software comprises first instructions for determining loss of a specific one or more of the data packets on the basis of the identifiers in the data packets received, and second instructions for requesting via the data network the specific one or more of the lost data packets.

This embodiment is relevant to, e.g., the software developer, a network operator or a content provider, who markets the software as an after-market add-on to data processing equipment so as to render the equipment suitable for receiving and processing the content information.

The invention can also be embodied as a data structure representative of content information encoded as data packets for a transport stream encapsulated according to a container format standard that allows an optional field in a packet header. Each respective one of the data packets forms a respective payload of a respective datagram in a connectionless communication protocol. The optional field in each respective one of the data packets carries a respective identifier for identifying the respective data packet in a pre-determined sequence of the data packets. This embodiment is relevant to, e.g., the content provider or service provider. As known, the expression "data structure", as specified by IEEE, refers to a physical or logical relationship among data elements, designed to support specific data processing functions.

BRIEF DESCRIPTION OF THE DRAWING

The invention is explained in further detail, by way of example and with reference to the accompanying drawing, wherein:

FIG. 4 is a diagram illustrating a manner of identifying packets in accordance with an embodiment.

Throughout the Figures, similar or corresponding features are indicated by same reference numerals.

DETAILED DESCRIPTION

Figure 1:
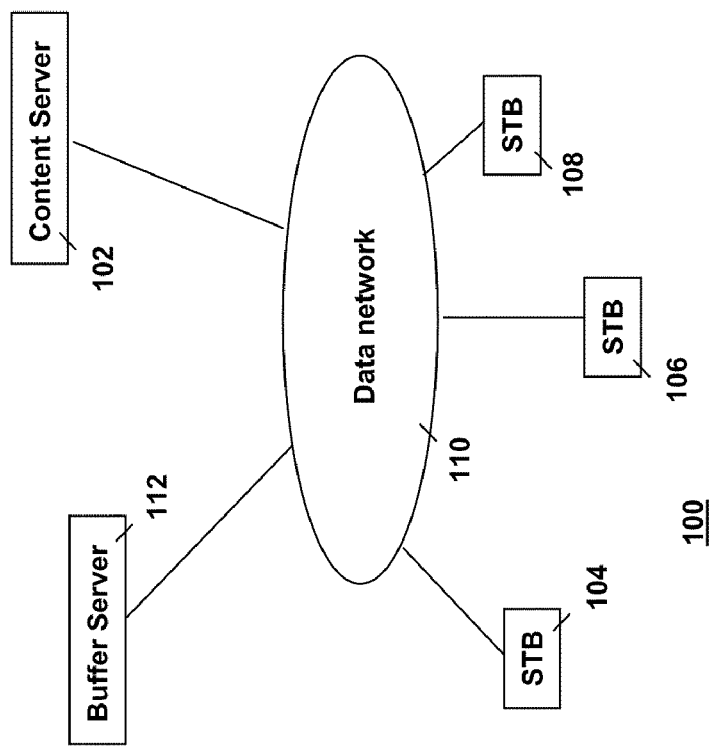
FIG. 1 is a block diagram of a system in the invention.

FIG. 1 is a block diagram of a system 100 in the invention. System 100 comprises a server 102 that provides a multicast service of content information to a plurality of receivers 104, 106, . . . , 108, which may be, for example, STBs, via a data network 110. If the transmission from server 102 to receivers 104-108 is not reliable, and data packets may be lost on their way to any of receivers 104-108, the affected receiver, e.g., receiver 104, is preferably configured to determine that packet loss has occurred and to determine which packets have gone missing. If so, affected receiver 104 can contact a buffer server 112 via network 110. Buffer server 112 buffers the content information, or part thereof, during the multicast service. Receiver 104 requests buffer server 112 to supply the missing packet, and buffer server 112 sends the missing packet via a unicast transmission to the address of receiver 104. If receiver 104 receives the packet from buffer server 112 in time, receiver 104 can process the missing packet to restore integrity of the data, thus avoiding artifacts when the content information is rendered via receiver 104.

Server 102 transmits the content information, e.g., video and/or audio, as data packets in a transport stream. The audio and/or video information is encapsulated according to a container format that allows for an optional field in a packet header. Each packet of encapsulated content information forms a payload of an associated datagram in a connectionless protocol. Examples of suitable container format standards and connectionless protocols have been given above. For the purpose of illustrating the operation of the invention, it is assumed here that the content information is encapsulated in a MPEG-2 Transport Stream and that the connectionless protocol used in the multicast is UDP.

In order to enable receiver 104 to determine that packets have gone missing, an optional field in the header of each encapsulated MPEG-2 packet is used to carry an identifier of the MPEG-2 packet. The identifiers are such that receiver 104, upon extracting the identifiers from the packet headers of a group of encapsulated MPEG-2 packets, can determine the order of the received packets in a predetermined sequence of packets for rendering the content information, as well as their location in the sequence. Extraction of the packet headers can be done at the application level. Thus, receiver 104 can identify a specific one of the packets with respect to a successor and/or a predecessor in the pre-determined sequence of packets and therefore whether or not a specific one of the packets has not been received.

Figure 2:
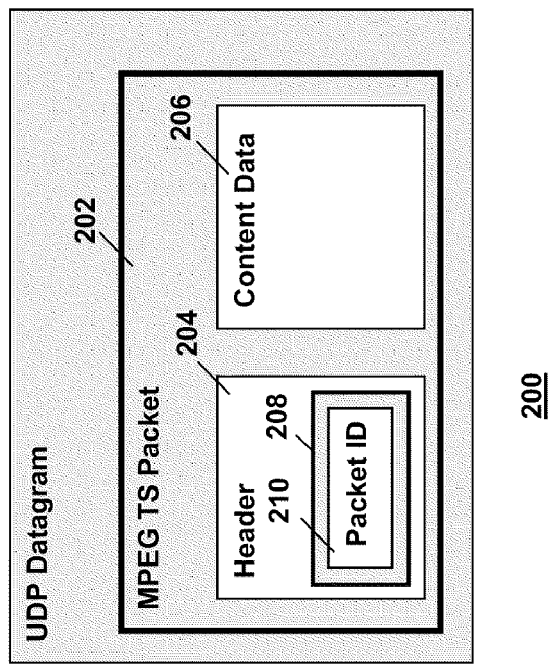
FIG. 2 is a diagram of a datagram with payload in the invention.

FIG. 2 is a diagram of an UDP datagram 200 to illustrate the formatting described above used by the content server 102 and STB's 104-108. Datagram 200 encapsulates a data packet 202 of content information encapsulated in the MPEG Transport Stream container format. Packet 202 has a header 204 and a payload 206 of content data. Header 204 contains multiple fields of which only field 208 is shown to not obscure the drawing. Field 208 is an optional field in the MPEG Transport Stream format, and is used here to carry a packet identifier 210. Another field (not shown) may be used to identify to buffer server 112 the content information being multicast. Upon extracting the header 204 from packet 202, receiver 104 can determine a value of the packet identifier 208. Receiver 104 may keep track of the identifiers of packets received from content server 102. The identifiers are formatted such that their position can be identified in a pre-determined sequence. Receiver 104 may then determine a specific data packet that may have gone missing if the identifier associated with the specific data packet is missing from the pre-determined sequence. Receiver 104 may then send a request via network 110 to buffer server 112 to retrieve the missing packet. Buffer server 112 may respond by sending the missing packet via data network 110 to receiver 104 in a unicast transmission. Upon timely receipt of the missing packet at receiver 104, the missing packet may be used to restore the integrity of the content information.

Now consider the scenario, wherein the receipt of the multicast content information at receiver 104 is interrupted by having it temporarily replaced by, e.g., a commercial from another source than content server 102. The replacement may occur at a node in the signal path between content server 102 and receiver 104, the node being upstream of receiver 104 and downstream of content server 102. The identifier of the first data packet received after receipt of the content information has been resumed by receiver 104, will not be the successor of the last data packet received before the commercial break. This then would cause receiver 104 to detect a discontinuity in the sequence of the identifiers, and to request the missing packets from buffer server 112 that correspond to the discontinuity as perceived by receiver 104. In this scenario, receiver 104 should be prevented from submitting such requests. Receiver 104 may therefore be configured to set an internal flag upon detecting that data packets have started to be received from another source. For example, the detection mechanism may be based on determining whether or not the data packets as received do have an identifier in the format according to the invention. So long as the received data packets do have these specific identifiers, no flag is set. As soon as a data packet without such identifier has been received, receiver 104 sets the flag. When the flag is set, receiver 104 refrains from submitting requests to buffer server 112. Then, after some time period, data packets start arriving at receiver 104 that do have these specific identifiers again. Upon receipt of the first one of such data packets having the specific identifiers, receiver 104 may reset the flag. Receiver 104 may then process all succeeding data packets as explained earlier and submit a request to buffer server 112 upon detection of a missing identifier.

More generically, the equipment according to the invention, e.g., receiver 104, is configured to operate as follows. Receiver 104 detects whether a data packet is received not having the identifier, and determines based on the lack of identifier that the data packet is received from a source different from content server 102. Upon detection of the data packet from a different source, receiver 104 disables the requesting of missing data packets from buffer server 112, e.g., by setting a flag in a register (not shown) internal to receiver 104. After detecting that receipt of data packets with identifiers has resumed, receiver 104 may enable the requesting of missing data packets, e.g., by means of resetting the internal flag.

As to the condition of a timely receipt, this depends on the kind of processing of the content information at receiver 104. Consider a first scenario wherein the multicast content information is being rendered at receiver 104 upon receipt. In this scenario, a missing packet can only be used to restore integrity within a relatively small time window. Receiver 104 may actively buffer a certain amount of packets before beginning rendering so as to increase this time window, thus allowing more time for determining what packets have been lost, for requesting buffer server 112 to send these lost packets via unicast transmissions, and for local processing of the packets received via unicast in order to restore integrity before rendering. For a live program being multicast, the delay introduced between receipt via multicast and receipt via unicast is preferably in the order of a fraction of a second.

Consider a second scenario wherein the multicast content information is being recorded locally at receiver 104 for rendering with a time shift of, say, hours or days. It may then be more efficient for receiver 104 to notify buffer server 112 with a single request of a batch of missing packets, after the multicast has completed, and for buffer server 112 to transmit the batch of missing packets all at once to receiver 104 in a single unicast or in a few unicast transmissions, thus reducing data traffic between receiver 104 and buffer server 112 with respect to the first scenario.

Consider a third scenario wherein the multicast content information is initially being rendered upon receipt at receiver 104 and wherein the user of receiver 104 decides during the multicast to time-shift the rendering using the "pause"-functionality as known from personal digital video recorders (PVRs), e.g., to make a phone call. In the pause mode, the packets received via multicast are buffered locally at receiver 104. This third scenario is then a combination of the first and second scenarios mentioned earlier. During the time period of rendering upon receipt of the multicast packets, single requests per missing packet are made to buffer server 112. After the user has invoked the pause-functionality at receiver 104, receiver 104 may make a single request to buffer server 112 for missing packets and, after a predetermined time has elapsed in the pause mode, begin buffering identifiers of missing packets and submitting a batch request for missing packets to buffer server 112, either periodically or when the pause functionality is turned off. During the pause, the time of receipt at receiver 104 of the missing packets, identified during recording, is less critical then in the first scenario.

The above scenarios of conditionally sending requests to buffer 114 may be taken care of by receiver 104 at the application level. That is, software running on receiver 104 may control when to submit requests to buffer server 112 and for how many missing packets.

The above scenarios may work satisfactorily if each identifier is unique within the multicast. However, a typical piece of content information, e.g., a movie, requires a very large number of data packets to be multicast. If each individual packet has a unique identifier within the set of all packets together representing the movie, a large number of bits need to be reserved in header field 208 for accommodating an individual identifier. An embodiment of the invention therefore uses identifiers that are recurrent, e.g., cyclically recurrent, during the multicast. This requires fewer bits in header field 208. Now, an individual packet can be uniquely identified only within a particular subset of packets being multicast.

The use of recurrent identifiers during the multicast implies that buffer server 112 and content server 102 need to synchronize in some way or another so as for buffer server 112 to be able to uniquely identify the packet identified in the request from receiver 104.

One way is to divide the content information in multiple contiguous ranges and use a further identifier per range of identifiers that themselves are being recurrently multicast. The further identifier itself may be recurrent as well upon a certain number of recurrent ranges of packet identifiers having been used.

Figure 3:
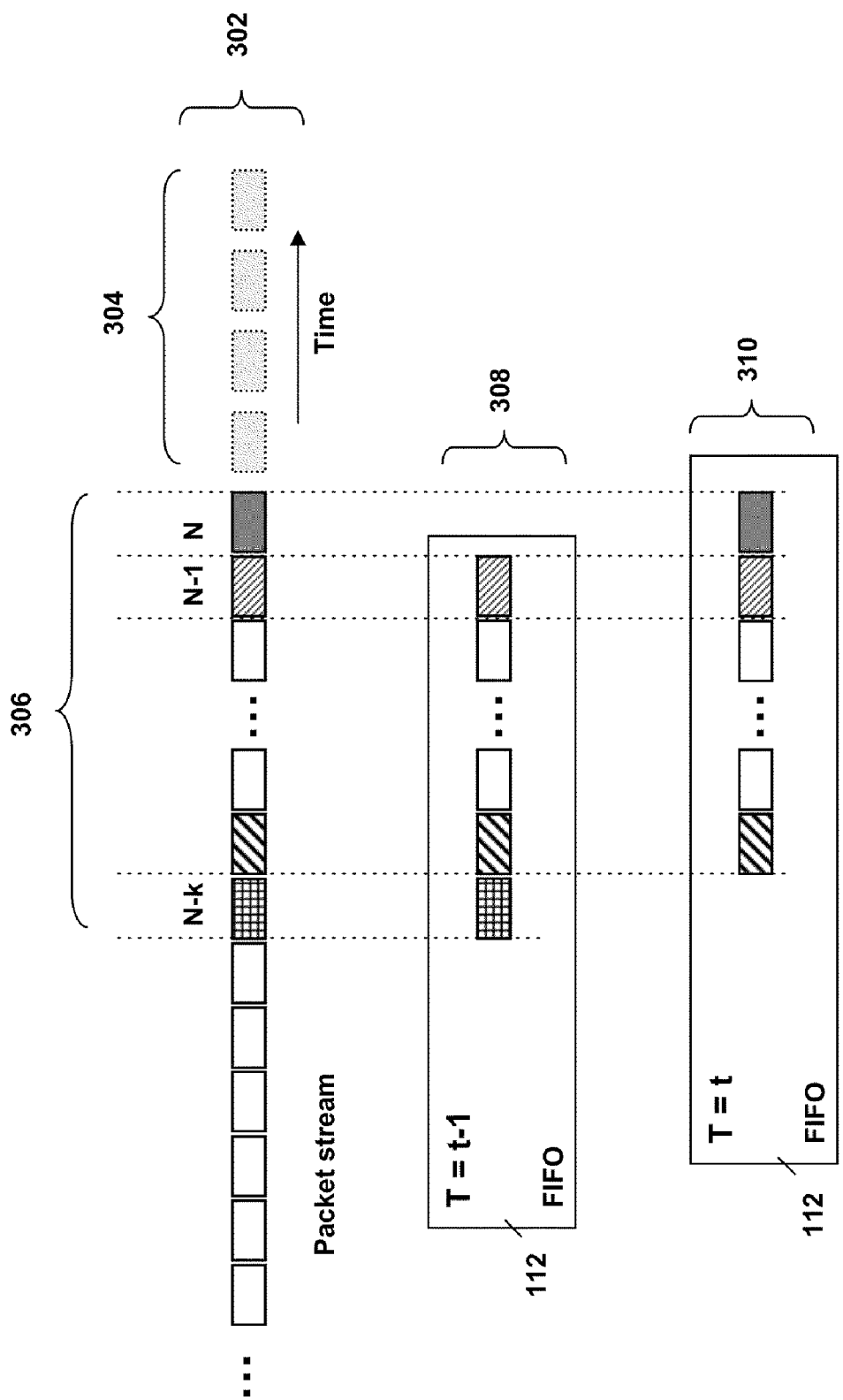
FIG. 3 is a diagram illustrating a sliding window FIFO configuration of a buffer in the system of the invention.

FIG. 3 is a diagram that illustrates another way for synchronizing buffer server 112 to content server 102. This other way is particularly suitable for the above-noted first scenario and third scenario. Buffer server 112 now only buffers part of the multicast packets in a first-in-first-out (FIFO) memory. In this manner, buffer server 112 implements a window that slides along the packet stream as multicast by server 102, the sliding being synchronized with the multicast. The number of packets contained in this window is determined by the number of bits in the optional field. Requests from receiver 104 cannot be honored for packets that have been overwritten in the FIFO of buffer server 112. This then imposes a time restriction on the requests from receiver 104 in order for receiver 104 to restore integrity. The time restriction depends on the width of the time window of the FIFO, the total of the amount of time needed at receiver 104 to determine the missing packet, the amount of time needed to prepare the request and send it to buffer server 112, the amount of delay in network 110, the amount of time needed by buffer server 112 to process the request and send the packet per unicast, again the amount of network delay, and the amount of time needed at receiver 104 to process the request and restore data integrity of the content information. This total time can be estimated in advance if the configurations of receivers 104-108, and of buffer server 112 are known in advance. These latter are assumed to be fixed entities in operational use, i.e., these do not change over time. Network delay can be estimated as well, dynamically if needed so as to be able to dynamically adjust the time window at buffer server 112 in response to changes in network delay.

In the diagram of FIG. 3, reference numeral 302 indicates at a time T=t the state of the stream of MPEG-packets, encapsulated in UDP datagrams, as sequentially multicast from server 102. Reference numerals 304 indicate the encapsulated MPEG packets that are going to be multicast next, one after the other. Reference numeral 306 indicates a sequence of data packets ordered according to their identifiers (N−k), . . . , N−1 and N. Reference numeral 308 indicates the state of buffer server 112 at time T=(t−1). For convenience, the temporal units have been chosen such that an increment in time by one unit corresponds to the transmission of a next one of the data packets in a multicast. At time T=(t−1), the FIFO of buffer server 112 stores the most recent k packets that have identifiers (N−k), . . . , N−2 and N−1. Reference numeral 310 indicates the state of buffer server 112 at time T=t, when the FIFO of buffer server 112 has deleted the packet with identifier (N−k) and has buffered the packet with identifier N. In this manner, the FIFO of buffer server 112 maintains a sliding window along the data stream, and buffer server 112 can only comply with requests received from receiver 104 that refer to a packet buffered in the FIFO at the time of receiving the request.

FIG. 4 is a diagram for explaining the use of recurrent packet identifiers in a multicast. Reference numeral 402 indicates a first subset of the MPEG packets that together are representative of the content information to be multicast.

Reference numeral 404 indicates a second subset of the MPEG packets that together are representative of the content information to be multicast. Each of subsets 402 and 404 uses the same identifiers: 1, 2, ..., (N−1) and N, for uniquely identifying a particular packet only within the respective subset. If buffer server 112 now receives a request for a packet with a particular identifier, for example identifier ID=2, then buffer server 112 cannot uniquely identify the packet meant. This is so, because each of the subsets that, combined, make up the encoded content information, includes a packet with identifier ID=2.

One way of resolving this issue is to individually label the subsets in an additional optional field in header 204. The packet, indicated with a subset label and a packet identifier can be identified. If buffer server 112 does not store the complete content but only a part thereof that, in addition, changes according to the sliding window process indicated above, the packet can still be uniquely identified, but the request cannot be honored if the sliding window has passed the desired packet. The probability that the request can be honored increases with an increased span of the window. Note that the subset labels can then also be made recurrent so as to reduce the bits to be spent on accommodating the label with the highest value. This approach is suitable for the first and third scenarios mentioned above, wherein in the first scenario the content is rendered synchronously with the multicast, and wherein in the third scenario the content is initially rendered synchronously with the multicast, but whose rendering gets time-shifted later on.

Another way is to not label the subsets at all, but to have the FIFO span a single subset, the size of which can be chosen based on practical criterions. The FIFO then always contains a single packet per particular identifier. The minimum size of the subset, and therefore the range of the identifiers, is then chosen such that it can be used in the first scenario mentioned above, wherein the content is being rendered practically synchronously with the multicast.

The invention claimed is:

1. A method of multicasting content information to a plurality of receivers via a data network, using data packets in a transport stream, wherein:
   the content information is encapsulated according to a container format that provides an optional field in a packet header portion;
   each respective one of the data packets forms a payload of a respective datagram in a connectionless communication protocol;
   the method comprises populating the optional field in each respective one of the data packets to carry a respective one of multiple sequential identifiers for identifying the respective data packet in a pre-determined sequence of the data packets;
   buffering at least part of the content information during the multicasting in a buffer;
   upon receipt of a request for a specific data packet containing a specific one of the identifiers from a particular one of the receivers, sending the specific one of the data packets via a unicast transmission to the particular receiver;
   maintaining a history of the specific data packets sent to each particular receiver via previous unicasts;
   based on the history, determining to send one or more further buffered data packets having further ones of the identifiers belonging to a particular range of the identifiers to one of the particular receivers; and
   sending the one or more further buffered data packets without receiving an associated request from the one of the particular receivers.

2. The method of claim 1, wherein the multiple sequential identifiers cyclically repeat across said pre-determined sequence of data packets.

3. The method of claim 1, wherein the buffer is a first-in first-out (FIFO) buffer having a size less than the size of the predetermined sequence of data packets.

4. Data processing equipment comprising an interface to a data network and configured for processing content information received via the data network as data packets in a transport stream, wherein:
   the content information is encapsulated according to a container format that provides an optional field in a packet header portion;
   each respective one of the data packets forms a payload of a respective datagram in a connectionless communication protocol;
   the optional field in each respective one of the data packets carries a respective identifier for identifying the respective data packet in a pre-determined sequence of the data packets;
   the equipment comprising a processor and instructions stored in data storage, which when executed cause the processor to:
      determine loss of a specific one or more of the data packets on the basis of non-receipt of one or more of the identifiers in the pre-determined sequence of data packets received and to request, via the data network, the specific one of the data packets from a buffer server;
      detect whether a further data packet is being received not having the identifier;
      disable the requesting of non-received identifiers upon detection of the further data packet; and
      subsequently enable the requesting upon detecting that receipt of data packets having the identifiers has resumed.

5. The equipment of claim 4, further configured to queue requests for non-received identifiers, and to send a plurality of queued requests in a single batch request to the buffer server.

6. The equipment of claim 5, wherein the queuing of requests is initiated responsive to detecting that the equipment is in a pause state.

7. The equipment of claim 5, where in the single batch request is transmitted after receipt of a last data packet in the transport stream.

8. The equipment of claim 5, wherein the equipment buffers a pre-determined number of the packets prior to beginning rendering of the content so as to increase a time window for retrieving missing packets from the buffer server.

9. A non-transitory computer-readable medium having control software stored thereon that, in response to execution by a data processing equipment, causes the data processing equipment to perform operations, the data processing equipment comprising an interface to a data network and being configured for processing content information received as data packets in a transport stream via the interface, wherein, the content information is encapsulated according to a container format standard that allows an optional field in a packet header, each respective one of the data packets forms a respective payload of a respective datagram in a connectionless communication protocol, and the optional field in each respective one of the data packets carries a respective identifier for identifying the respective data packet in a pre-determined sequence of the data packets;

wherein the control software comprises:
first instructions for determining loss of a specific one or more of the data packets on the basis of the sequential identifiers in the data packets received,
second instructions for requesting, via the data network, the specific one of the data packets from a buffer server,
third instructions for detecting whether a further data packet is being received not having the identifier;
fourth instructions for disabling the requesting of non-received identifiers upon detection of the further data packet; and
fifth instructions for subsequently enabling the requesting upon detecting that receipt of data packets having the identifiers has resumed.

10. The computer readable medium of claim 9, further comprising third instructions for queuing requests for non-received identifiers, and for sending a plurality of queued requests in a single batch request to the buffer server.

11. The computer readable medium of claim 10, wherein the queuing of requests is initiated responsive to detecting that the equipment is in a pause state.

12. The computer readable medium of claim 10, where in the single batch request is transmitted after receipt of a last data packet in the transport stream.

* * * * *